Figure 2:
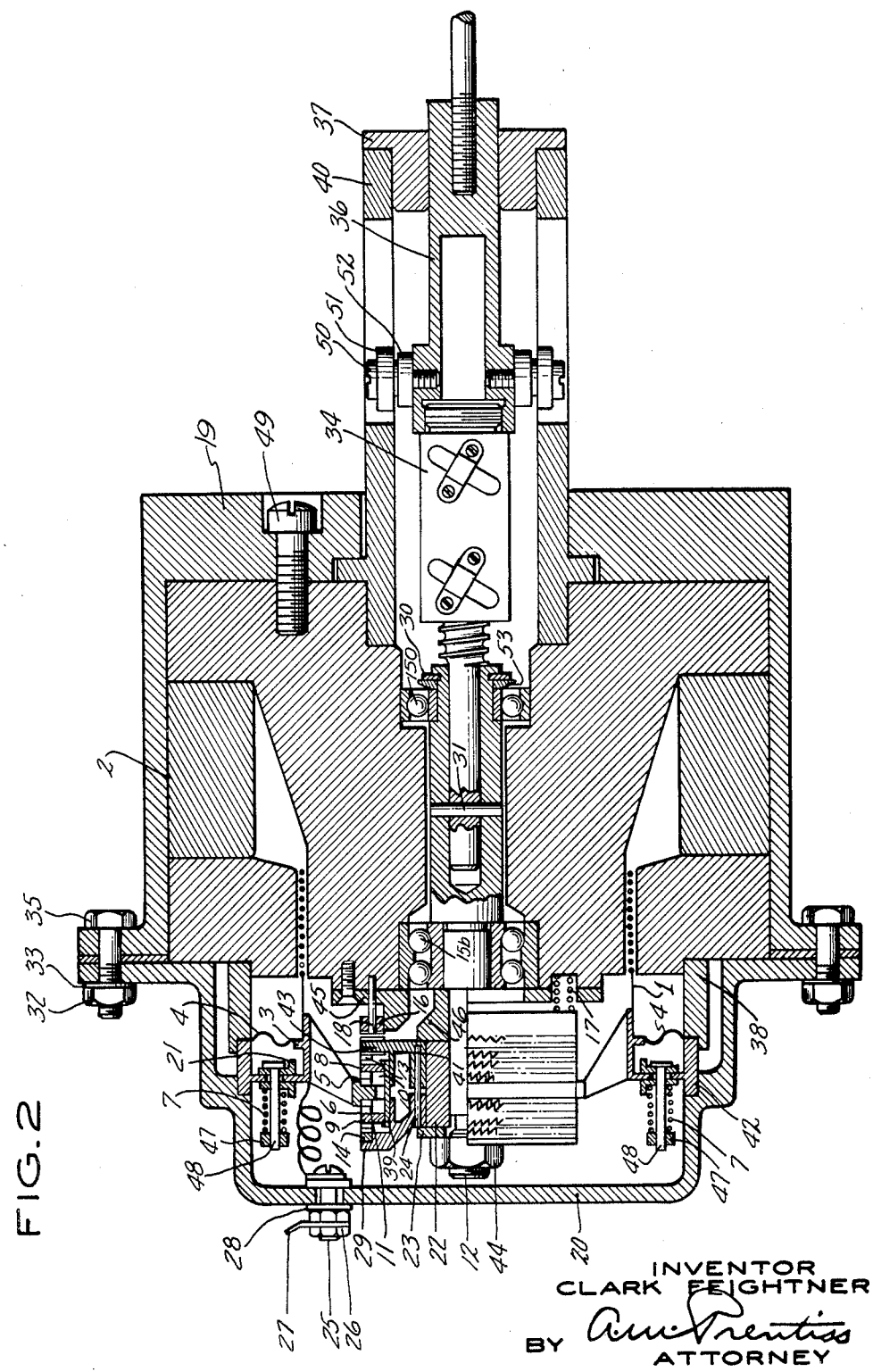

Nov. 9, 1965  C. FEIGHTNER  3,217,192
BIDIRECTIONAL ELECTRIC PULSE ACTUATOR
Filed Aug. 14, 1962  2 Sheets-Sheet 1
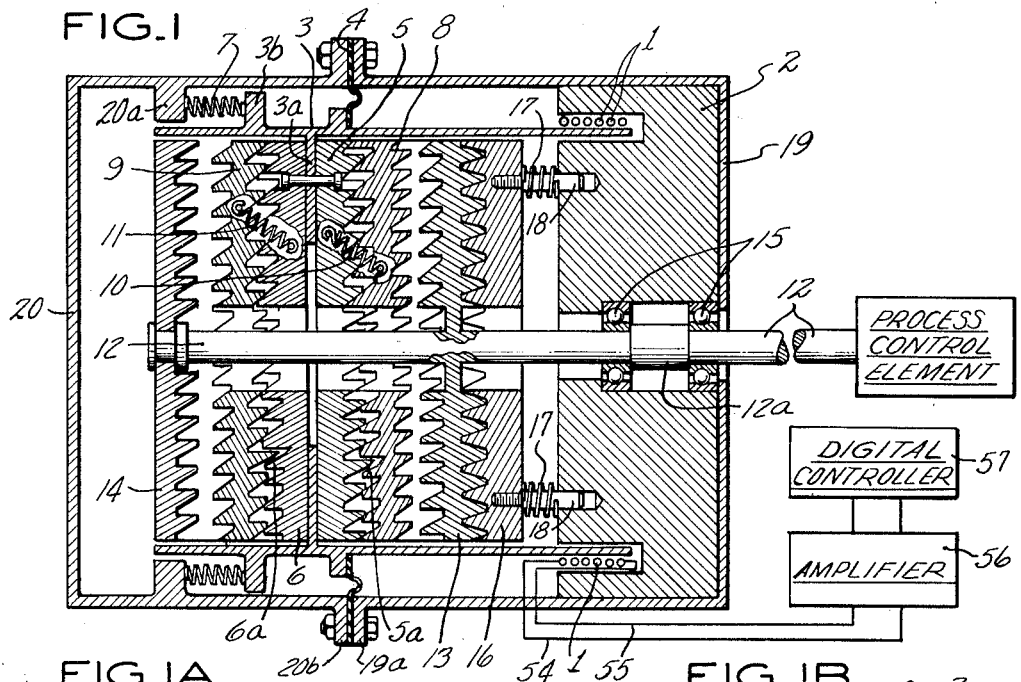
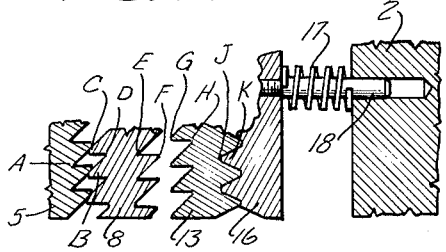
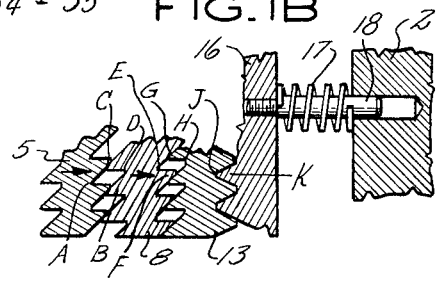
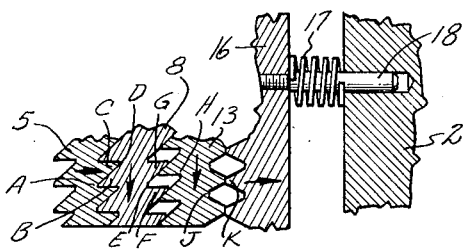
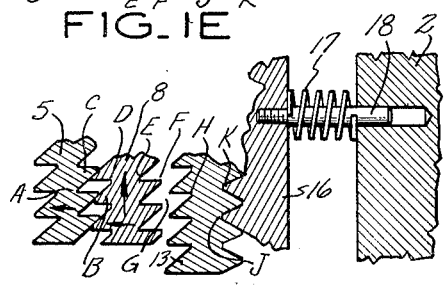
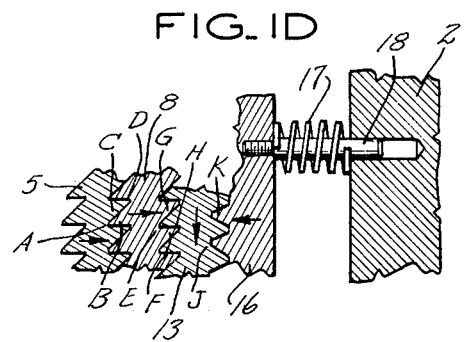
INVENTOR
CLARK FEIGHTNER
BY
ATTORNEY Nov. 9, 1965     C. FEIGHTNER     3,217,192
BIDIRECTIONAL ELECTRIC PULSE ACTUATOR
Filed Aug. 14, 1962     2 Sheets-Sheet 2

INVENTOR
CLARK FEIGHTNER
BY *Am Prentiss*
ATTORNEY

United States Patent Office 3,217,192
Patented Nov. 9, 1965

3,217,192
BIDIRECTIONAL ELECTRIC PULSE ACTUATOR
Clark Feightner, North Canton, Ohio, assignor to
Chandler Evans Inc., a corporation of Delaware
Filed Aug. 14, 1962, Ser. No. 216,895
12 Claims. (Cl. 310—49)

This invention pertains to electromechanical pulse actuators, which operate valves, or other control elements, of a system to be controlled; and more particularly, has reference to digital pulse process control actuators, having much higher dynamic response, and at higher power levels, than is possible with such prior art devices.

Heretofore, in the art of digital pulse process control, one severe limitation to optimum control is how rapidly the process control valves can be actuated by currently available valve actuators. These valve actuators must be able to respond to electrical pulses (which are a function of upstream sampled conditions) from the system computer, and accordingly open or close the system control valves in a stepwise fashion. Thus, each valve can respond to computer demands only as fast as its actuator can respond to electrical pulses from the computer. For finer process control, with smaller step changes in process parameters, it therefore becomes necessary to have available faster responding valve actuators. In addition, any new and faster valve actuator must be capable of high power levels of operation, so that sufficient motivating force is delivered for valve stem movement at high signal frequencies where appreciable power losses will be unavoidable. Furthermore, if the computer, during peak load changes, is sampling data and delivering pulses faster than the presently available actuators can receive them, an expensive pulse storage device must be included in the system and appreciable lags are introduced between commands and responses.

Heretofore, proposed solutions of the problem of electrical actuation of valves or other system controls include: an electric to pneumatic converter, driving a standard pneumatic valve; a geared down servomotor operating from a standard feedback loop; electrically heated vapor which, when pressurized due to heating, drives a valve stem; electrically controlled hydraulic pressure which drives a valve stem; a clutching mechanism on a continuously rotating motor; and an electro-mechanical device utilizing the moving iron cores of two separate solenoids for output motion in either of two directions. These prior art "stepping motors" have not been designed for actuator-type service, and in addition to low frequency response, many suffer from poor reliability and hunting during stopping.

In an effort to achieve a high time response and reliable valve actuator, I have, in this invention, departed from all of the above prior art methods of electrical valve actuation, and have developed a new mode of electrical valve actuation, which in the process control industry will greatly improve and simplify performance.

The problem is to devise an electro-mechanical pulse actuator with much higher dynamic response, and at higher power levels than is possible with heretofore existing devices.

In prior art devices, iron core magnetic circuits are used, wherein the inclusion of the iron in the moving parts severely limits the dynamic response of the device. The high inductance of the iron core magnetic circuits (necessary to move the iron core) produces an electrical time constant that is too high and contributes to a too limited dynamic response. In addition, the inertia of the moving iron core results in a low dynamic response. To compensate for these limitations, fast signal pulse rates must be stored in a special delaying unit and released at lower rates for acceptance by existing devices for computer driven valve applications.

Accordingly, one of the principal objects of my invention is to provide a high enough dynamic response to obviate the necessity of having to employ an economically and physically undesirable storage unit.

Another object of my new invention is to provide a device which is able to discriminate between positive and negative signals (i.e., its output must be bi-directional) and has the capability of either linear or rotary outputs.

Other objects of my invention are to devise an electrical pulse actuator which embodies the following novel features:

(a) Use of a moving coil and permanent magnet for valve actuation purposes.

(b) Use of a lightweight moving coil to produce axial motion at a high power level for valve actuation purposes.

(c) Use of a lightweight moving coil capable of stepping loads at high rates (in the neighborhood of 400 steps/sec.).

(d) Use of a single coil and magnet to produce bi-directional stepping rotation.

(e) Use of a bi-directional ratchet assembly for conversion of a single bi-directional axial coil motion to bi-directional rotary (or linear with the addition of a ball screw assembly) output shaft motion.

(f) The arrangement of the above components to accomplish a high pulse rate at a high power level, with movement in either direction using one electro-motive force unit.

With the foregoing and other objects in view, which may be incidental to my improvements, my invention comprises the combination and arrangement of elements as described hereinbelow and illustrated in the accompanying drawings, in which:

FIG. 1 shows a schematic representation, in central longitudinal section, of my invention;

FIGS. 1–A to 1–E, inclusive, are fragmentary views of a portion of FIG. 1, showing the elements depicted in various positions during a cycle of their operation, as more particularly described hereinbelow.

FIG. 2 is a central longitudinal section of a preferred embodiment of my invention, in which elements having the same reference number as elements shown in FIG. 1 are the same.

FIGURE 1 shows a schematic representation of the principal parts, numbered 1 through 20, of the assembled device which are sufficient to explain its basic mode of operation, as described hereinbelow. An aluminum wire coil 1 lies between the poles of a permanent magnet 2 and is integrally wound onto the end of a non-magnetic coil tubular support 3 of nylon or the like. Coil 1 is electrically connection by wires 54 and 55 through an amplifier 56, to a digital computer 57, from which it receives a square voltage signal pulse. The permanent magnet 2 is integrally connected to a housing 19, and the coil support 3 is carried by a flexible diaphragm 4 which prevents rotation of the coil support, while permitting sliding motion thereof, relative to the permanent magnet 2. The coil support 3 is integrally connected by a flange 3a to a pair of oppositely-opposed, right and left hand, nylon drive ratchets 5 and 6, so that linear axial motion of the coil support 3 is directly transmitted to the drive ratchets 5, 6.

A coil support return spring 7, interposed between a flange 3b of support 3 and a flange 20a on a housing cover 20, keeps the coil support 3 and therefore the drive ratchets 5, 6 in a centered neutral position when in a no-signal state, as described hereinbelow.

On the drive ratchet 5 rides a right-hand idler ratchet 8, and on drive ratchet 6 rides a left-hand idler ratchet 9, which are respectively kept in indexed positions relative to the drive ratchets 5 and 6, respectively, by a right-hand idler index spring 10, and a left-hand idler index spring 11, mounted inside of the ratchet faces. Stops 5a and 6a, on the drive ratchets 5 and 6 respectively, prevent the right hand idler index spring 10 from indexing the right hand idler ratchet 8 too far up, relative to the right hand drive ratchet 5; or the left hand idler index spring 11 from indexing the left hand idler ratchet 9, too far down relative to the left hand drive ratchet 6. The stops are set so that the right hand idler ratchet 8 can rotate one-half of a ratchet space down, relative to the right hand drive ratchet 5; and the left hand idler ratchet 9 can rotate one-half of a ratchet space up, relative to the left hand drive ratchet 6. Otherwise, the drive ratchets 5, 6 and the idler ratchets 8, 9 translate as a unit upon motion of the coil 1.

Running through, and independent of, the drive ratchets 5 and 6, and the idler ratchets 8 and 9, is the driven shaft 12 upon which are integrally mounted a right-hand driven ratchet wheel 13 and a left-hand driven ratchet wheel 14. The driven shaft 12 (and thus the driven ratchet wheels 13 and 14) is prevented from axial motion by a thrust bearing, represented by a shoulder 12a on the driven shaft 12, mounted between a pair of driven shaft bearings 15 in which the driven shaft 12 rotates.

The right-hand surface of the ratchet wheel 13 meshes with an annular detent ratchet 16, which is preloaded against the ratchet wheel 13 by a detent spring 17. The detent ratchet 16 carries a plurality of detent ratchet pins 18 which slide axially in cavities in the permanent magnet 2, while preventing any rotation of the detent ratchet 16, and thus of the shaft 12, until the detent holding torque is exceeded. A housing cover 20 carries a flange 20b, which is secured to a mating flange 19a on housing 19, and holds the diaphragm 4 in place against the housing 20. The housing 19, permanent magnet 2, and bearings 15 combine to axially position the driven shaft 12 and to lock it against axial movement.

Referring to FIGURE 2 elements 21 through 53 and their functions, are as follows:

21—Positioning Rings; annular rings which center the coil support 3 on a lip on the spacer 42, under the action of the coil support return spring 7.
22—Sleeve; annular spacer on the driven shaft 12.
23—Washer; bearing surface for the nut 44.
24—Cylindrical pin which locks the left hand 29 and right hand 43 wheels against relative rotation.
25—Screw; mountings for the power input lugs 27.
26—Nut; mountings for the power input lugs 27.
27—Soldering Lug; electrical connection to the coil 1.
28—Insulator; insulates the lugs 27 from the housing cover 20.
29—Left Hand Wheel; mounting surface for the left hand driven ratchet wheel 14. Rotates as a unit with the driven shaft 12.
30—Retaining Ring; holds the driven shaft 12 against leftwards motion through the bearing spacer 53 and the bearing 15a.
31—Retaining Pin; locks the driven shaft 12 and the input shaft of the ball screw 34 against relative rotation or axial movement.
32—Nut; attaches housing cover 20 to housing 19.
33—Washer; attaches housing cover 20 to housing 19.
34—Ball Screw; converts rotary motion of driven shaft 12 to linear motion of ball screw extension 36.
35—Screw; attached housing cover 20 to housing 19.
36—Ball Screw Extension; linear output motion delivered to control valve.
37—Guide Bushing; sliding bearing surface for the ball screw extension 36.
38—Spacer; annular ring which holds the diaphragm 4 against spacer 42. Bears against a shoulder on the permanent magnet 2.
39—Outer Bushing; sliding surface and positive stop for the idler ratchets 9, 11.
40—Guide Bushing Support; cylindrical slotted piece in which the ball screw 34 is carried. Held in place by a lip between the housing 19 and the permanent magnet 2.
41—Inner Sleeve; cylindrical sleeve, located just inside the outer bushing 39, which slides to the left or right on lips on the left 29 and right 43 hand wheels as the coil support 3 is moved to the left or right. The inner sleeve 41 is glued to the outer bushing 39.
42—Spacer; annular lipped spacer held in place between the housing cover 20 and the spacer 38. See parts 21 and 38 for dual function.
43—Right Hand Wheel; mounting surface for the right hand driven ratchet wheel 13. Rotates as a unit with the driven shaft 12.
44—Nut; clamps the left 29 and right 43 hand wheels to the driven shaft 12 through the washer 23, the spacer 46, the bearing 15b and a shoulder on the driven shaft 12.
45—Bearing Retainer; annular lipped ring which holds the bearing 15b in place against the permanent magnet 2. Screwed to the permanent magnet 2 by flat head screws. Lip on the bearing retainer acts as a sliding surface for the detent ratchet 16.
46—Spacer; annular piece located on the driven shaft 12. See part 44 for function.
47—Spring Retainer; small annular piece holding the coil support return spring 7 in place on the pin 48.
48—Pin; guide and carrying surface for the coil support return spring 7.
49—Screw; mounts the permanent magnet 2 in the housing 19.
50—Bearing Retainer; holds the bearing 51 in place against the bearing spacer 52.
51—Bearing; prevents the ball screw extension 36 from rotating while permitting it to translate as the bearing 51 slides in the slot in the guide bushing support 40.
52—Bearing Spacer; annular spacer. See part 50 for function.
53—Bearing Spacer; annular spacer. See part 30 for function.

FIGURE 1A shows an enlarged portion of the ratchet drive assembly 5, 8, 13 and 16, in its neutral position when no signal pulse from controller 57 and amplifier 56 occurs. Upon receipt of a square wave voltage signal from the amplifier 56 the coil 1 and the coil support 3 will move to the right or left, depending upon the polarity of the input signal. A right-hand motion of the coil support 3, and therefore the drive ratchet 5 will be described. Similar arguments follow for left-hand motion of the coil support 3 and the left-hand drive ratchet 6.

After one-third of a coil 1 stroke to the right, the right-hand idler ratchet 8 comes into contact with the right-hand driven ratchet wheel 13 along the inclined ratchet faces as shown in FIGURE 1B. At this point: the right hand idler and drive ratchets 8 and 5 are translated as a unit and no relative rotation has yet occurred; the right-hand driven ratchet wheel 13 has not yet rotated; and the left-hand idler and drive ratchets 9 and 6 are merely carried along, and have no effect upon the motion of the driven shaft 12, for right-hand motion of the coil support 3.

During the next third of a coil 1 stroke to the right, the right-hand idler ratchet 8 is rotated down (counterclockwise when viewed from the shaft end of the device) through one-half of a ratchet space by the right-hand drive ratchet 5, until the surfaces AB and CD come into contact. While this occurs the right-hand driven ratchet wheel 13 gets pushed down one-half of a ratchet space by the right-hand idler ratchet 8, so that the right-hand driven ratchet wheel 13 moves down one-half of a detent gap, relative to the detent ratchet 16, as the detent ratchet 16 is forced to the right against the detent spring 17 action. Point J on the right-hand driven ratchet wheel 13 is thus below point K on the detent ratchet 16 as shown in FIGURE 1C.

During the last third of the coil 1 stroke to the right, the right-hand idler ratchet 8 continues to push the right-hand driven ratchet wheel 13 down, until point J on the right-hand driven ratchet wheel 13 is one full detent gap below point K on the detent ratchet 16, whereupon the detent ratchet moves back to the left, and surface EF comes into contact with surface GH, as shown in FIGURE 1D. Thus, one-half of the right-hand driven ratchet wheel 13 rotation per pulse is contributed by the relative rotation of the right-hand idler ratchet 8 and the right-hand drive ratchet 5, and the other half by the relative rotation of the right-hand driven ratchet wheel 13 and the right-hand idler ratchet 8. It is to be understood that these two contributions occur simultaneously and are only considered separately as in FIGURES 1C and 1D for purposes of clarity.

When the signal is removed the coil support return spring 7 brings the coil support 3, and therefore the right-hand drive ratchet 5, back to the neutral position. As this occurs, and as soon as the right-hand idler ratchet 8 clears the right-hand driven ratchet wheel 13 the right-hand idler index spring 10 indexes the right-hand idler ratchet 8 back up one-half of a ratchet gap relative to the right-hand drive ratchet 5. Stops 5a on the right-hand drive ratchet 5 limit this indexing action. The ratchet drive assembly is thus in a state of preparation for the next signal pulse, and the right-hand driven ratchet wheel 13 has been driven down one full gap, relative to the right-hand drive ratchet 5, as shown in FIGURE 1E. The right-hand driven ratchet wheel 13 is held in its new position against external shaft torques by the action of the detent ratchet 16 and the detent spring 17. The resulting detent torque must be overcome by the drive ratchets 5 and 6 when the right- or left-hand driven ratchet wheels 13 or 14 move relative to the detent ratchet 16, which slides to the right axially to permit the right-hand driven ratchet wheel 13 to rotate down, or the left-hand ratchet wheel 14 to rotate up.

The driven shaft 12 will thus rotate one ratchet gap down or up for each pulse that causes the coil support 3 and drive ratchets 5 and 6 to move to the right or left respectively. If linear output motion is desired rather than rotary, it is a simple matter to attach the shaft to a ball screw assembly, such as 34, chosen to yield any required mechanical advantage.

From the foregoing description, it can be seen that electrical pulse actuator of my invention incorporates a low inertia moving coil 1 operating in the field of a permanent magnet 2. Pulses of current to the moving coil 1 drive a ratchet power transmission assembly 5, 6, 8, 9, 10, 11, 13 and 14. Right hand motion of the coil 1 rotates an output shaft 12 in one direction and left hand motion of the coil rotates the output shaft in the opposite direction. The ratchet assembly is arranged such that each electrical pulse steps the output shaft through a given angle. The angular position of the output shaft 12 is thereby proportional to the number and polarity of the pulses received by the coil 1. The device is capable of responding directly to pulse rates of the order of magnitude of 400 pulses/sec.

The output shaft 12 of the actuator may be connected directly to a rotary valve stem control, or if linear motion of the final control shaft is desired, the output shaft 12 of the actuator may be coupled to a ball screw assembly 34 for converting the rotary actuator shaft output to linear output motion at the required mechanical advantage.

The high dynamic response of the electrical pulse actuator of my invention eliminates the need for a special signal storage unit and it can be driven directly from a digital controller 57 with a low level signal utilizing a simple power amplifier 56. The limiting effects of low force (or torque) to inertia ratio, common to other types of electrical pulse actuators, is greatly reduced in my invention by elimination of iron core magnetic circuits and the use of light weight materials in the moving parts, such as aluminum in coil 1 and nylon in the ratchet power transmission assembly 5–14, and in coil support 3; all of which results in a much higher dynamic response and force level.

While I have shown and described the electric pulse actuator of my invention as applied to the operation of a rotary or reciprocating control valve, it is to be understood that my invention is equally applicable to any other form of control element as for example, an electric circuit switch or current controller.

Although my invention has been shown and described in its preferred embodiment, the invention is not limited to the details of construction and arrangement of elements, as disclosed for the purpose of illustration, since these may be changed and modified by those skilled in the art without departing from the spirit of my invention, or exceeding the scope of the appended claims.

Having thus disclosed my invention, I claim:

1. An actuator, comprising; a permanent magnet, a single, coreless, wire coil armature, movable axially in the magnetic field of said permanent magnet, said wire coil fixedly attached to a nonmagnetic support, motion transmission means secured to said nonmagnetic support, said motion transmission means secured to a control element, said motion transmission means including means so constructed and arranged that bidirectional axial movement of said nonmagnetic support is converted to a corresponding bidirectional incremental step rotary movement of said control element.

2. An actuator according to claim 1 wherein the motion transmission means comprises a bidirectional ratchet assembly, the driver portion of said ratchet assembly secured to said support and the driven portion of said ratchet assembly secured to said control element, said ratchet assembly converting bidirectional axial motion of said support to corresponding bidirectional rotary motion of said control element.

3. An actuator, including a control element, comprising; a permanent magnet, a single coreless wire coil armature, movable axially in the magnetic field of said permanent magnet, said wire coil fixedly attached to a non-magnetic support, first means secured to said non-magnetic support, second means secured to said control element, motion transmission means intermediate said first means and said second means, said motion transmission means including means so constructed and arranged that bidirectional axial movement of said non-magnetic support produces a corresponding bidirectional incremental step rotary movement of said control element.

4. In an actuator according to claim 3, wherein the first means secured to said non-magnetic support comprises the driver portion of a bidirectional ratchet assembly, said second means secured to said control element comprises the driven portion of a bidirectional ratchet assembly, said motion transmission means intermediate said first and second means comprises the idler ratchet elements of a bidirectional ratchet assembly.

5. In a digital process control system having a control element, an incremental electromagnetic pulse actuator, comprising: a magnetic circuit, having a single, coreless, wire-coil armature, movable axially in the magnetic field of a permanent magnet, in response to a high-frequency, electrical signal pulse from a digital system computer electrically connected to said coil; said coil being fixedly attached to a non-magnetic support, means connecting said support to an element to be controlled, including means moving said element stepwise by a single preselected increment, in either of two opposite directions, in response to each electrical signal pulse received by said coil from said computer.

6. Digital control apparatus having an incremental electric pulse responsive actuator comprising; a magnetic circuit having a coreless, wire coil, armature, movable axially in the magnetic field of a permanent magnet, in response to an electric pulse to said wire coil, said wire coil fixedly attached to a non-magnetic support, a bi-directionally movable ratchet assembly connecting said support to an element to be controlled, said ratchet assembly converting a single, bi-directional, linear movement of said armature, to a corresponding bi-directional rotary movement of said control element.

7. A pulse actuator according to claim 6, wherein the electrical signal pulse from said computer is amplified by an amplifier, interposed in the electric circuit between said computer and said actuator, sufficiently to move said ratchet assembly, from its neutral position, said neutral position occurring when no signal pulse is present, in one of two opposite directions, depending upon the polarity of the signal pulse.

8. A pulse actuator according to claim 7, wherein said ratchet assembly comprises a pair of oppositely disposed, coaxial annular drive ratchets, which are fixedly attached to said armature support, and are connected by a flexible diaphragm to a housing of said actuator, so that said drive ratchets can move with said armature in alternatively opposite, axial directions, but are precluded from rotary movement, by said diaphragm.

9. A pulse actuator according to claim 8, wherein an annular, right-hand idler ratchet rides on one of said drive ratchets, and an annular left-hand idler ratchet rides on the other said drive ratchet; each of said idler ratchets being respectively kept in indexed position relative to its drive ratchet, by an attached index spring, which biases each idler ratchet towards its respective drive ratchet; and each drive ratchet being provided with a stop, to prevent the attached index spring from indexing its idler ratchet more than one-half of a ratchet tooth space, relative to its attached drive ratchet.

10. A pulse actuator according to claim 9, wherein said ratchet assembly also comprises a pair of coaxial, annular, driven ratchet wheels, each of which is disposed opposite to its adjacent idler ratchet, and is connected by a common coaxial rod to said control element; each of said driven ratchet wheels being so constructed and arranged as to be rotatively driven by its adjacent idler ratchet when in abutting contact therewith, and to transmit its rotary movement to said control element.

11. A pulse actuator according to claim 10, wherein each drive ratchet and driven ratchet wheel is provided with a flange having a series of equally spaced ratchet teeth which intermesh, when each drive ratchet is axially moved into contact with its adjacent driven idler ratchet; each of said teeth being formed with a surface parallel to the axial movement of its ratchet, and a surface inclined to said axial movement; said drive ratchets, idler ratchets, driven ratchet wheels, and their intermeshing teeth, being so constructed and arranged that each driven ratchet and said control element are rotated an angular distance, corresponding to the circumferential width of a tooth, for each electrical impulse received by said actuator.

12. A pulse actuator according to claim 11, wherein one of said driven ratchet wheels is also provided with a series of equally spaced detent ratchet teeth, so constructed and arranged as to intermesh with a corresponding series of teeth, on an annular detent ratchet, that is non-rotatively mounted coaxially with said driven ratchet, and is biased against said driven ratchet by a spring; the teeth on said detent ratchet having the same base width as the teeth in said driven ratchet, so that said detent ratchet holds said driven ratchet in a position differing its previous position by the angular distance of one tooth width, until the holding torque of said detent ratchet is exceeded.

References Cited by the Examiner

UNITED STATES PATENTS

| | | | |
|---|---|---|---|
| 1,977,745 | 10/34 | Thompson | 310—49 |
| 2,548,731 | 4/51 | Lehde | 310—49 |
| 2,763,793 | 9/56 | Krasney | 310—20 |
| 3,121,776 | 2/64 | Blume | 310—49 |
| 3,121,812 | 2/64 | MacAuthur | 310—49 |
| 3,139,549 | 6/64 | Groth | 310—49 X |

FOREIGN PATENTS

| | | |
|---|---|---|
| 608,607 | 11/60 | Canada. |
| 871,115 | 6/61 | Great Britain. |

ORIS L. RADER, *Primary Examiner.*

MILTON O. HIRSHFIELD, *Examiner.*